United States Patent [19]

Mallory et al.

[11] 4,362,443

[45] Dec. 7, 1982

[54] PNEUMATIC TUBE CARRIER END CLOSURE ADAPTER UNIT

[76] Inventors: Jeffrey B. Mallory, 2238 High Point Cir., Carrollton, Tex. 75007; Charles M. Campbell, 609 Ann Lois La., Burleson, Tex. 76028

[21] Appl. No.: 169,947

[22] Filed: Jul. 18, 1980

[51] Int. Cl.³ .............................................. B65G 51/06
[52] U.S. Cl. .................................................... 406/188
[58] Field of Search .............. 406/184, 186, 187, 188, 406/189, 190; 220/331, 66, 69

[56] References Cited

U.S. PATENT DOCUMENTS

| | | | |
|---|---|---|---|
| 1,807,834 | 6/1931 | Erby | 406/188 |
| 1,911,713 | 5/1933 | Pravda | 406/188 X |
| 3,506,216 | 4/1970 | Delamater | 406/188 |
| 3,556,436 | 1/1971 | Roelandt | 406/188 |
| 3,701,497 | 10/1972 | Anders et al. | 406/188 |
| 3,787,008 | 1/1974 | Barnett et al. | 406/190 |
| 3,788,577 | 1/1974 | Barnett et al. | 406/188 |

Primary Examiner—John J. Love
Assistant Examiner—Gene A. Church
Attorney, Agent, or Firm—Hubbard, Thurman, Turner & Tucker

[57] ABSTRACT

A reversible air seal construction for a carrier used in a pneumatic tube system, for use on a carrier of the type having a pair of air seal rings surrounding the carrier body spaced from each other and from the ends of the carrier. The reversibility is accomplished by means of spacers that may be positioned either outside of or between the two air seal rings so that two distinct spacings may be accomplished between the two air seal rings. The positioning of the spacer relative to the air seal ring is facilitated by means of an end adapter unit carrying a closure construction and arrangement for an open end of the tubular material-conveying carrier for the pneumatic tube system. The adapter unit houses a pivot mechanism including a cam member integrally molded with and forming circumferential axis of rotation for a disclike end cap which forms the closure for the tubular material-conveying carrier. The cam face is in the shape of a trapezoid or an inverted triangle which has been truncated along a line parallel to one side of the triangle and between that side and the opposite vertex. Also disposed within the adapter unit is a floating cam follower fixed against rotation but sliding up and down against a biasing spring. In operation, the adapter unit is held against the tubular material-conveying carrier by a tongue and groove lock requiring cooperation between tabs on the adapter unit and tubular material-conveying carrier both of which are locked within a groove formed within the cylindrical walls of the spacer rings.

8 Claims, 7 Drawing Figures

PNEUMATIC TUBE CARRIER END CLOSURE ADAPTER UNIT

BACKGROUND OF THE INVENTION

1. Field of the Invention

The invention relates to pneumatic tube systems and to carriers for such systems, and more particularly to the use of an adapter end closure which may be physically separated from a tubular material-conveying carrier to provide a means for reversing spacing between air seals held at either end of the tubular material-conveying carrier. The adapter unit is designed to house a unique camming arrangement for use in biasing an end closure for the carrier.

2. Description of the Prior Art

Prior art pneumatic tube system carries do not show a means of disengaging end portions from a tubular material-conveying carrier where the end portion as a unit includes not only the disclike end cap but also the entire pivoting mechanism for the end closure. Accordingly, prior art pneumatic tube system carriers are not designed to facilitate the quick and easy replacement or repositioning of the air seal ring which is normally found near each end of such carriers.

Prior art closure arrangements also do not provide a simple end closure biasing system suitable for use with a plastic cam and cam follower. Prior art cam biasing systems employ metal cams and followers frequently formed in the shape of an ellipse or parabola. The provision of an elliptical cam face for a plastic cam is impractical due to the limitations of the material. The applicants will disclose a simple and inexpensive cam biasing arrangement suitable for use in its adapter unit end closure.

A spring-biased toggle-connected mechanism contained in the cavity formed within an end closure to urge and hold the closure in either a fully closed or fully opened position is shown in the U.S. patent granted to Barnett, U.S. Pat. No. 3,788,577, granted on Jan. 29, 1974. This patent does not disclose a camming arrangement. Instead, a toggle mechanism operates within the plane of the disclike end closure. The only point of similarity is in Barnett's use of a pivot channel positioned at a circumferential edge of the disclike closure and perpendicular to the disclike closure for insertion into a wall of a tubular material-conveying carrier. Barnett does not provide for detaching an end piece from the tubular material-conveying carrier which end piece would contain the entire, fully assembled biasing mechanism.

Replaceable wear rings for use in providing an efficient seal during travel through a pneumatic tube are disclosed in the patent granted to Barnett, U.S. Pat. No. 3,787,008, granted on Jan. 22, 1974. Barnett discloses an annual shoulder formed on each end portion of a tubular material-conveying carrier against which a wear ring is seated and retained by a collar or retaining ring. However, the retaining ring is mounted by a press fit on the outer cylindrical surface of the tubular material-conveying carrier. While Barnett asserts that the retaining ring can be removed from the carrier body to replace the wear ring, it is clear that the retaining ring is destroyed in the process. This is because the retaining ring is preferably bonded by an adhesive and must itself be replaced in the process of changing the wear ring. The system devised by the applicants comprehend the repeated use of a spacer ring. The applicants' spacer ring is not a press fit, but, rather, is itself used to hold the end closure adapter unit against the end of the tubular material-conveying carrier. Barnett shows no species of a tongue and groove locking arrangement comparable to that comprehended by applicants.

closure of a pneumatic tube carrier is disclosed in the patent granted to Delamater, U.S. Pat. No. 3,506,216, granted on Apr. 14, 1970. The torsion bar of this disclosure extends down the entire length of the tubular material-conveying carrier. The biasing action provided by the torsion bar causes the closure member to cam across an abutment end of the tubular material-conveying carrier in a toggle-like fashion. In the fully opened position, the closure member pivots freely on the torsion bar. The disadvantages of the carrier disclosed by Delamater is that the torsion bar provides little resistance to movement of the closure end axial to the tubular material-conveying carrier. The result is that the end closure rattles and is easily mispositioned so that the torsion bar is bent or otherwise damaged. Delamater does not disclose reversible, or even removable, air seal rings; nor does his pivot biasing arrangement lend itself to use in a self-contained end closure adapter unit such as that disclosed by the applicants.

Other toggle mechanisms for biasing disclike closure elements on a pneumatic tube carrier are shown in the patent granted to Anders, U.S. Pat. No. 3,701,497, granted on Oct. 31, 1972; and the patent granted to Roelandt, U.S. Pat. No. 3,556,436, granted on Jan. 19, 1971. These disclosures are quite similar in that they show a pivot shaft which is anchored in a side of the tubular material-conveying carrier. Both employ spring biasing toggle arrangements disposed within the plane of the disclike closure member. Both employ metal disc members on the inside edge of the disclike closure member in an effort to provide rigidity against axial vibration and dislocation. Anders also provides a pivot sleeve telescoped over the pivot shaft and journaled onto the pivot shaft. The substantial metal composition of these end closures obviously make them more difficult and expensive to manufacture. Also, no provision is made for removing the air seal; and the lid may not be separated from the tubular material-conveying carrier except by extracting retaining pins or screws from the wall of the tubular material-conveying carrier.

Early forms of biasing for pneumatic tube carrier closure members are illustrated by the patents to Erby, U.S. Pat. No. 1,807,834, granted on June 2, 1931; and to Pravda, U.S. Pat. No. 1,911,713, granted on May 30, 1933. These two patents are similar in that both employ a rod traversing the entire length of the tubular material-conveying carrier. In Erby, a lid attached to the rod is extracted from the inside of the tubular carrier and pulled up against the tension of a coil spring spiralling between a sleeve fixed to the wall of the tube and a keeper ring fixed to the bottom of the rod. Pravda accomplishes substantially the same thing by pushing down on a sliding top wall of the tubular carrier causing the closure member to be revealed and then rotated to one side. In Pravda, a coil spring pushes on an interior telescoping tube rather than on the pivoting rod itself. As in Delamater, the provision of a rod extending the length of the tubular carrier precludes separation of end adapters for the purpose of adjusting spacing between air seal rings.

In all of the references cited, the use of a substantial amount of metal parts and fittings increases the cost of production and the difficulty of repair. In all of the references cited, except Barnett, pivot pins or rods are easily damaged by bending or breaking when the disclike end closure is in the open position. In all of the references cited, the pivot pin is anchored in a wall of the tubular material-conveying carrier by means of retainer pins or screws. Such means of anchoring the pivot pins prevents the easy removal of the end closure as a fully assembled unit and increases the likelihood that the entire tubular carrier will be cracked or otherwise damaged by stresses suffered by the closure disc when such disc is in the open position.

The applicants' pivot pin is not constrained against rotation by any retainer pins or screws. It serves merely as an axis of rotation for the cam and as a travel shaft for the cam follower in conjunction with a small helical spring spiralling around the pivot shaft between the sliding cam follower and a keeper ring and spring clip securing the pivot pin against axial dislocation.

In summary, none of the prior art references show an end closure unit which may be separated from the tubular carrier as a unit without the use of any tools whatsoever. Also, none of the prior art references show a reversible air seal ring capable of assuming two distinct spacings. The prior art discloses various forms of spring-loaded lid closure means which hold a disc-shaped lid in either open or closed position. While none of the patents reviewed show a spring-loaded cam arrangement similar to that about to be disclosed by the applicant, commercially available devices made by Security and Mosler use a spring-loaded cam arrangement employing machined steel parts rather than the cheaper molded plastic materials made possible by the applicants' novel configuration of such a spring-loaded cam arrangement.

SUMMARY OF THE INVENTION

Objectives of the invention include providing a pneumatic tube system carrier that may be manually separated so that closure means are fully contained within one separated element; which makes it possible to sandwich a spacer ring and air lock ring between raised annular shoulders existing in a proximate relation to an axial end of each of the separated elements; wherein the spacer ring is provided with an unique offset groove arrangement used in cooperation with tabs extending at the ends of and perpendicular to the axis of the separated cylindrical sections; and wherein the groove arrangement allows the spacer ring to be used in locking the sections together in either of two positions; and wherein the two positions of the spacer ring correspond to distinct spacing of the air seal ring; and which is a carrier composed almost entirely of non-metallic parts having an enhanced resistance to fatigue failure from use.

These objectives and advantages are obtained by providing an end closure adapter unit which includes as a single unitary assembly a biased pivot mechanism for use in gaining access to the interior of the tubular carrier. This end closure adapter unit is secured to one end of a tubular material-conveying carrier by means of a tongue and groove manual locking system making use of an offset groove arrangement carrier in the spacer ring previously alluded to. The adapter is channeled to receive a pivot sleeve, one end of which forms a cam face. The disclike end closure and pivot sleeve with cam face are molded together out of one piece of plastic. The portion of the adapter which receives the pivot sleeve also bears longitudinal grooves partially extending longitudinally on the walls of the receiving cylinder. The longitudinal grooves form a track in which laterally extending guide pegs of a plastic cam follower may move up and down within the receiving cylinder. A pivot pin passes axially through the pivot sleeve and cam follower and is secured at the bottom end of the receiving cylinder by a retainer ring and lock spring device. The cam follower is biased upward against the pivot sleeve with cam face by means of a spiral spring disposed around the pivot pin between the cam follower and the lock ring.

The circumferential edge of the adapter opposite the disclike closure member bears a plurality of outwardly extending tabs for use with the tongue and groove locking system previously referenced.

When a change in air seal spacing is desired, the spacer ring having interior offset grooves is manually rotated until the tab continue on the adapter unit and the tab contained on the tubular material-conveying carrier are freed. The freeing of the tabs allows separation of the adapter unit from the tubular carrier by sliding the tabs of the adapter down the portion of the slider ring groove which is slightly offset from the portion of the slider ring groove through which the tabs on the tubular carrier are slid. The spacer ring may then be inverted and the air seal laid against the spacer ring in its new orientation for reattachment to the adapter and tubular carrier.

BRIEF DESCRIPTION OF THE DRAWINGS

A preferred embodiment of the invention is set forth in the following description and shown in the drawings and is particularly and distinctly pointed out and set forth in the appended claims.

Similar numerals refer to similar parts throughout the drawings. The drawings illustrate the best mode which the applicants have contemplated in applying the principles of their invention.

DESCRIPTION OF THE PREFERRED EMBODIMENT

Figure 1:
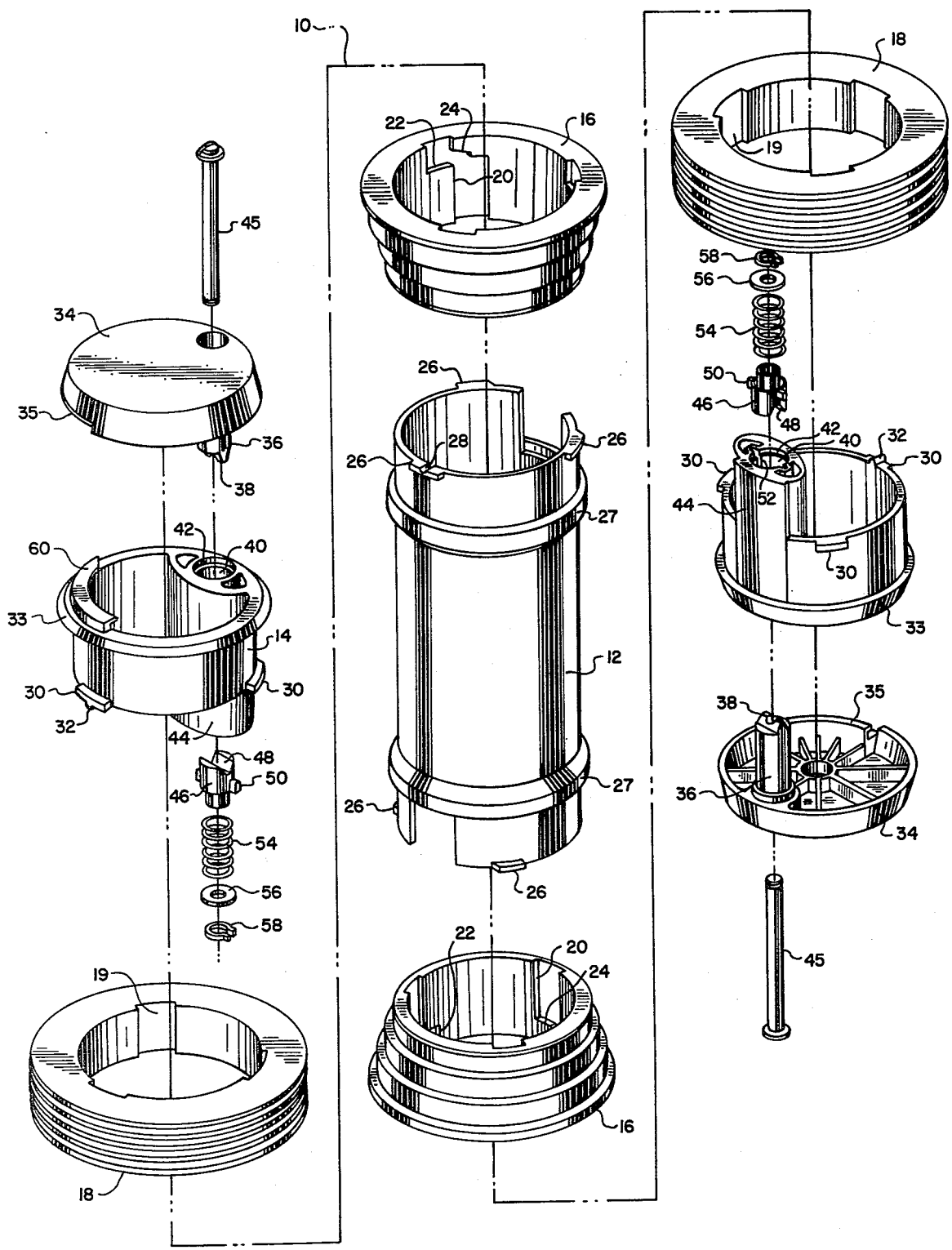
FIG. 1 is an exploded perspective view of a pneumatic tube carrier provided with an end closure adapter with reversible spacer ring and air seal.
Figure 2:
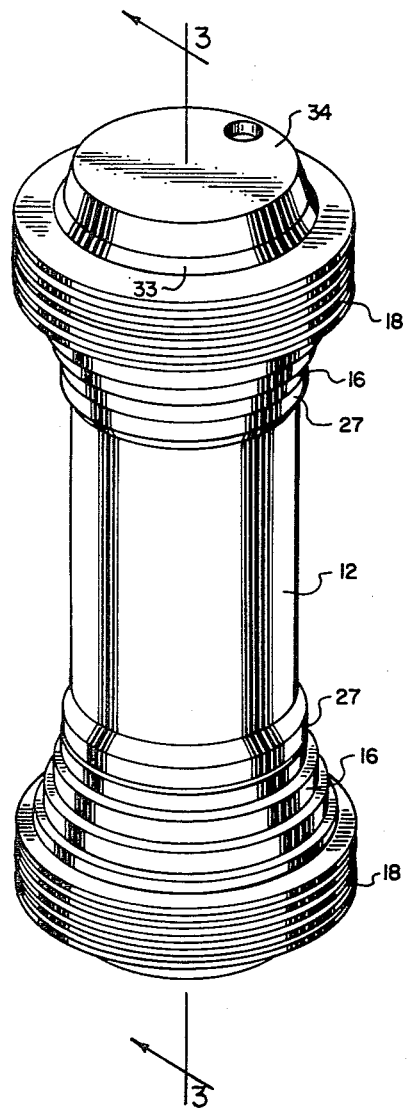
FIG. 2 is a perspective view of a pneumatic tube carrier showing one configuration of the spacer rings and air seals.
Figure 3:
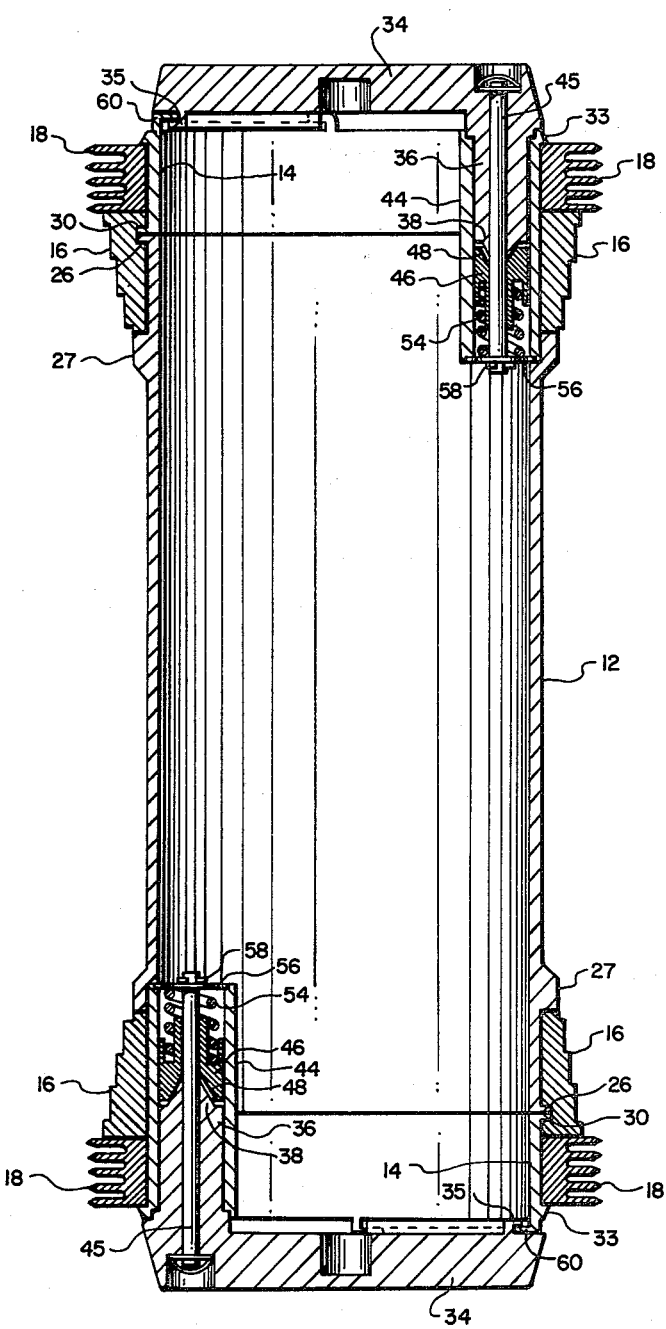
FIG. 3 is a cross section taken along line 3—3 of FIG. 2 showing the pivot biasing mechanism and showing the air seal and spacer rings held between annular shoulders.

The overall carrier for a pneumatic tube system as improved by the applicants is indicated by the numeral 10 applied to the line of explosion in FIG. 1. The carrier has three major parts that are combined with associated subassemblies to form the entire carrier as shown in FIG. 2. The three major parts shown in FIG. 1 are the tubular material-conveying carrier 12, and each of the end closure adapter units 14. A tapered spacer ring 16 as shown at the top and bottom center of FIG. 1 are adapted to slide over either end of the tubular carrier 12. Air seal ring 18 is then slid by means of grooves 19 onto adapter unit 14. Finally, adapter unit 14 and tubular carrier 12 are joined in axial abutment and secured upon the clockwise rotation of spacer ring 16.

I will now describe the way in which spacer ring 16 is used to lock adapter unit 14 and tubular carrier 12 in axial abutting relationship. Spacer ring 16 has an interior cylindrical surface and an outer generally conical or tapered surface. The interior cylindrical face of tapered spacer ring 16 is provided with three longitudinal offset grooves having a first path 20 and a second path 22. The two paths are offset so that the left wall of the longer first groove 20 forms the right wall of the shorter groove 22. The first and second paths 20 and 22 communicate at a common corner by means of sloped ledge 24. Sloped ledge 24 serves to terminate first groove 20. Sloped ledge 24 is significant in connection with the locking of tubular carrier 12 against adapter unit 14.

Tubular carrier 12 is fitted at each end with three outwardly extending narrow tabs 26, one of which has a slight depression 28 consisting of a curved groove having an axial orientation perpendicular to the axis of the tubular carrier.

Adapter unit 14 is fitted with tabs 30 corresponding to tabs 26 of tubular carrier 12. One of the tabs 30 of the adapter unit 14 is provided with a small raised curved surface 32 for fitting into the depression 28 on one of the tabs 26 of tubular carrier 12.

To perform the locking function, spacer ring 16 is aligned so that long grooves 20 match tubular carrier tabs 26 whereupon the spacer ring is lowered onto tubular carrier 12 until it is stopped by annular shoulder 27 thereon. At this point, tubular carrier tabs 26 will be at the end of long groove 20 in near proximity to slanted ledge 24.

Air seal ring 18 is then aligned so that grooves 19 match adapter unit tabs 30 whereupon the air seal ring is moved axially onto adapter unit 14 until it is constrained by annular shoulder 33 on adapter unit 14. Adapter unit 14 carrying air seal 18 is then aligned so that adapter unit tabs 30 correspond to short groove 22 on the spacer ring 16. Adapter unit 14 is then moved toward tubular carrier 12 until the exposed edge of the spacer ring 16 contacts the air seal 18. At this time, adapter unit tabs 30 are near the end of short groove 22 of spacer ring 16. Tubular carrier 12 is then rotated so that tubular carrier tabs 26 are aligned with adapter unit tabs 30. The alignment is also checked to verify that raised ridge 32 on adapter unit tab 30 has nested into depression 28 of tubular carrier tab 26. A compression lock is then effectuated by rotating the spacer ring 16 in a counterclockwise direction so that tubular carrier tabs 26 and adapter unit tabs 30 are forced against ledge 24 of spacer ring 16 and held there by a slight deformation in the tabs and spacer ring ledge 24. In this configuration the air seals 18 are spaced apart to the maximum extent.

We will now describe how the air seal rings may be reconfigured to produce the minimum spacing between air seal rings 18. Spacer ring 16 is rotated in a clockwise direction sufficient to free jointly the adapter unit tabs 30 and tubular carrier tabs 26. Adapter unit 14 and tubular carrier 12 may then be withdrawn from the spacer ring 16 by withdrawing each from opposite ends of spacer ring 16 after aligning adapter unit tabs 30 with the short groove 22 of spacer ring 16 and after aligning tubular carrier tabs 26 with the long groove 20 of spacer ring 16. After adapter unit 14 is free of spacer rings 16, air seal 18 is rotated so that air seal ring groove 19 align with adapter unit tabs 30, whereupon air seal 18 is removed from adapter unit 14 over adapter unit tabs 30.

Air seal ring 18 is then axially aligned with tubular carrier 12 and is rotated until air seal ring grooves 19 align with tubular carrier tabs 26. Air seal ring 18 is then thrust upon tubular carrier 12 until it is constrained by annular shoulder 27 of tubular carrier 12.

Spacer ring 16 is then inverted so that its wide edge is closest to air seal 18 when tapered spacer ring 16 is axially aligned with tubular carrier 12. Short grooves 22 of spacer ring 16 are matched with tubular carrier tabs 26 and spacer ring 16 is thrust onto tubular carrier 12 until constrained against air seal ring 18. In this position, tubular carrier tabs 26 will be close to the end of short grooves 22 of spacer ring 16.

Figure 4:
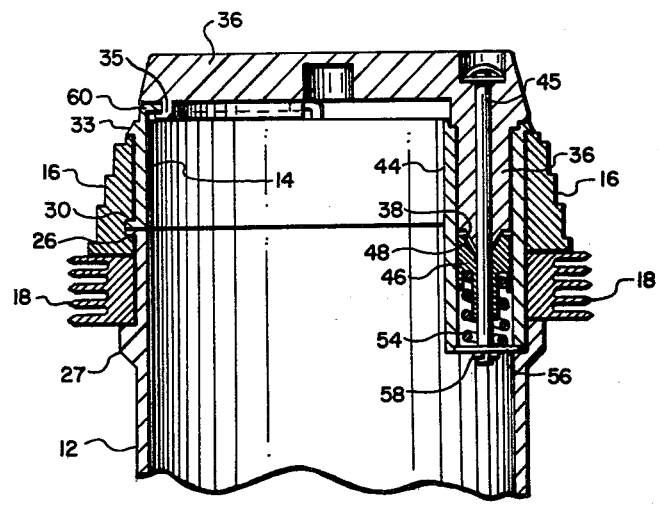
FIG. 4 is a cross sectional view taken along line 3—3 of FIG. 2 but showing the alternate configuration of the spacer ring and air seal.

Adapter unit 14 is then aligned axially with tubular carrier 12. Adapter unit tabs 30 are matched with long grooves 20 of spacer ring 16 at the narrow edge of spacer ring 16. Adapter unit 14 is then thrust into tapered spacer ring 16 until annular shoulder 33 contacts tapered spacer ring 16. Adapter unit 14 is then rotated until its tabs 30 are aligned with tubular carrier tabs 26 with the raised rounded ridge 32 of adapter unit tabs 30 nested in depression 28 of tubular carrier tabs 26. Tapered spacer ring 16 is then rotated in a counterclockwise direction to create a compression lock holding adapter unit tabs 30 tightly against tubular carrier tabs 26. The resulting configuration is as illustrated in FIG. 4.

We will now describe the connection between the adapter unit 14 and means contained therein for biasing end closure element 34 against retainer rim 60.

End closure element 34 is molded out of plastic and includes lip rim 35 and pivot sleeve 36 with cam face 38 formed thereon. Cam face 38 is in the form of a truncated isosceles triangle having a flat surface parallel to the base of the said isosceles triangle. The face of the isosceles triangle is less then the diameter of the circle that would be formed by taking a cross-section of pivot sleeve 36.

Pivot sleeve 36 is cylindrical in shape and is adapted to turn within cylindrical channel 40 contained within pylon 44 of adapter unit 14. Two longitudinal grooves 52 are cut in the walls of cylindrical channel 40 and extend a short way into cylindrical channel 40 beginning at an edge of cylindrical channel 40 defined by the protruding edge of pylon 44. An annular rim 42 is also cut out of walls of cylindrical channel 40 at the same end.

Cam follower 46 is adapted to slide into the aforesaid end of cylindrical channel 40. Guide pegs 50 extend out of the cylindrical side walls of cam follower 46. Guide pegs 50 are adapted to slide within grooves 52 cut into the cylindrical channel 40 of pylon 44.

Cam follower 46 is provided with a female cam receiving face defining the same cam shape as was previously described with respect to cam face 38.

Pivot sleeve 36 and cam follower 46 are axially channeled to receive pivot pin 45 which is inserted through pivot sleeve 36 past cam face 38 and through cam follower 46. The end of pivot pin 45 which extends past cam follower 46 is fitted with spiral spring 54 having a diameter larger than that of pivot pin 45 but smaller than the diameter of cylindrical channel 40 of pylon 44. Spiral spring 54 is held in compressed biasing relationship with cam follower 46 by keeper ring 56 which fits into annular rim 42 and is held against axial removal from pin 45 by spring clip 58 at the end of pivot pin 45.

Figure 5:
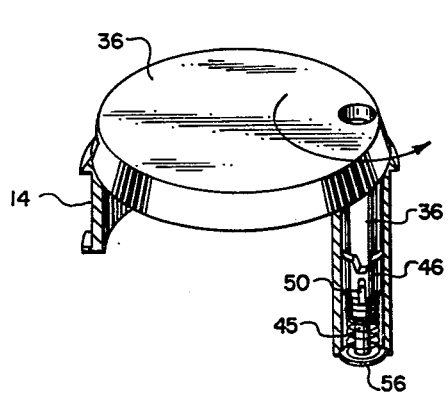
FIG. 5 is a fragmentary sectional view of the end closure assembly showing the position of the cam face with respect to the cam follower when the disclike end closure completely covers the end of the pneumatic tube carrier.
Figure 6:
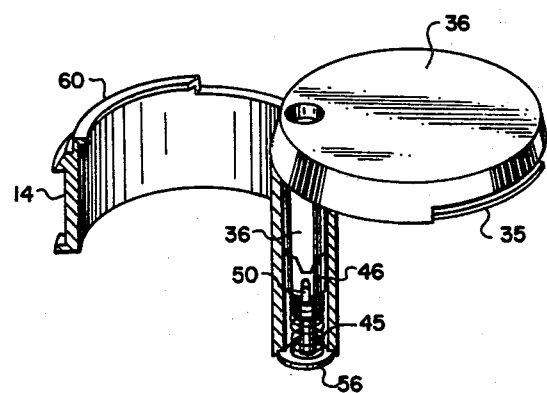
FIG. 6 is a fragmentary sectional view showing the position of the cam face with respect to the cam follower within the end closure assembly unit when the disclike closure element is in the open position.

End closure element 34 may then be rotated in a counterclockwise direction to reveal the interior of tube carrier 12. In half opened position, the flat surface of cam face 38 will slide across the flat surface of cam image 48 on cam follower 46. As the closure element 34 is rotated clockwise to closed position, cam face 38 crosses the threshold of cam image 48 and cam follower 46 is forced upward against cam face 38 by the action of spring 54. A torque is then imparted to closure element 34 which causes closure element 34 to rotate with a snap against retainer rim 60. Retainer rim 60 is adapted to engage lip 35 of closure element 34. When there is constraining contact between retainer ridge 60 and closure element lip rim 35, cam face 38 has not yet fully nested within cam image 48. Accordingly, a torque continues to be exerted holding closure element 34 firmly against retainer rim 60. The incomplete nesting of cam face 38 and cam image 48 is shown in FIG. 5. Complete nesting is possible in the fully opened position as shown in FIG. 6.

Figure 7:
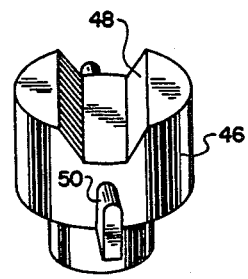
FIG. 7 is a perspective view of the cam follower.

In FIG. 7, guide peg 50 is shown extending from the cylindrical surface of cam follower 46 along a line slightly offset from the center line that would be defined by a parallel line halfway between the corners of the bottom of the trough formed by cam image 48. This offsetting relationship of guide peg 50 is shown in order to illustrate provision for the incomplete nesting shown in FIG. 5 which allows continuing torque to be applied against closure element 36 in the fully closed position.

The improved construction of the applicants' pneumatic tube carrier invention using an adapter unit to carry pivot bias mechanism and to secure a reversible air seal and spacer ring combination provides to the public a simple, durable, and inexpensive pneumatic tube carrier which may be adapted for use in a variety of pneumatic tube configuration having different requirements for air seal ring spacing. In order for the adapter unit to be used to best advantage, it is necessary that the pivot mechanism be contained completely within the adapter unit. The applicants have accomplished this objective in the embodiment disclosed herein. Not only is the pivot mechanism completely contained within the adapter unit, but the pivot mechanism also reduces considerably the stresses on the various plastic components of the pneumatic tube carrier. This reduction is accomplished by eliminating the use of metal retainer pins or screws which, in prior art devices, tend to absorb shocks resulting from torque applied to the pivot pin. In the applicants' invention, such torque is absorbed by guide pegs 50 which are made out of plastic and correspondingly less likely to cause cracking in the carrier housing.

In certain applications it may be necessary to use an adhesive to prevent rotation of spacer ring 16 when mounted on adapter 14 and tubular carrier 12. The adhesive would be applied to the interior surface of spacer ring 16.

In the foregoing description, certain terms have been used for brevity, clearness, and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the end closure adapter unit is built and used, the characteristics of the new construction, and the advantageous, new and useful results obtained; the new and useful structures, devices, elements, arrangements, parts, and combinations are set forth in the appended claims.

We claim:

1. Apparatus for containing articles to be conveyed through a pneumatic tube, which comprises:

a tubular material-conveying carrier having first and second ends, at least one hollow end closure housing having first and second ends, attaching means on the first end of the at least one end closure housing, attaching means on the at least one end of said tubular material-conveying carrier, annular restraining means at the second end of said at least one end closure housing, annular restraining means set away from said at least one end of said tubular material-conveying carrier, at least one air seal ring adapted for insertion over said attaching means of said first end of said at least one end closure housing and capable of being restrained against axial movement past said second end of said at least one end closure housing unit by said annular restraining means thereon, the at least one air seal ring adapted for insertion over the attaching means on the at least one end of the tubular material-conveying carrier and capable of being restrained by said annular restraining means set off from said at least one end of said tubular material-conveying carrier, means for securing the attaching means of the first end of said at least one end closure housing to the attaching means of said at least one end of said tubular material-conveying carrier, space filling means for preventing axial movement of the at least one air seal ring between the annular restraining means on the second end of said at least one end closure housing and the annular restraining means set away from said at least one end of said material-conveying carrier, at least one disclike cap for covering said second end of said at least one end closure housing unit, means contained within the at least one end closure housing unit and attaching to the at least one disclike cap for pivoting the disclike cap in its own plane about an axis located near a circumferential edge of the said disclike cap, and means for creating a torque at the axis of rotation of said at least one disclike cap and acting between said disclike cap and said at least one end closure housing.

2. The apparatus for containing materials to be conveyed in a pneumatic tube as claimed in claim 1, wherein the said means for spacing and the said means for securing are together incorporated into at least one spacer ring having an interior cylindrical surface on which the means for securing is located, and said spacer ring having an axial length sufficient to fill the space between the annular restraining means set off from said first end of said tubular material-conveying carrier and the annular restraining means at the second end of said end closure housing except for a space occupied by said at least one air seal ring.

3. Apparatus for containing articles to be conveyed through a pneumatic tube, which comprises:

a tubular material-conveying carrier having first and second ends,
at least one hollow end closure housing having first and second ends,
attaching means on the first end of the at least one end closure housing,
attaching means on the at least one end of said tubular material-conveying carrier,
annular restraining means at the second end of said at least one closure housing,
annular restraining means set away from said at least one end of said tubular material-conveying carrier,
at least one air seal ring adapted for insertion over said attaching means of said first end of said at least one end closure housing and capable of being restrained against axial movement past said second end of said at least one end closure housing unit by said annular restraining means thereon,
the at least one air seal ring adapted for insertion over the attaching means on the at least one end of the tubular material-conveying carrier and capable of being restrained by said annular restraining means set off from said at least one end of said tubular material-conveying carrier,
means for securing the attaching means of the first end of said at least one end closure housing to the attaching means of said at least one end of said tubular material-conveying carrier,
space filling means for preventing axial movement of the at least one air seal ring between the annular restraining means on the second end of said at least one end closure housing and the annular restraining means set away from said at least one end of said material-conveying carrier,
at least one disclike cap for covering said second end of said at least one end closure housing unit,
means contained within the at least one end closure housing unit and attaching to the at least one disclike cap for pivoting the disclike cap in its own plane about an axis located near a circumferential edge of the said disclike cap,
means for creating a torque at the axis of rotation of said at least one disclike cap and acting between said disc-like cap and said at least one end closure housing,
wherein the said means for spacing and the said means for securing are together incorporated into at least one spacer ring having an interior cylindrical surface on which the means for securing is located,
said spacer ring having an axial length sufficient to fill the space between the annular restraining means set off from said first end of said tubular material-conveying carrier and the annular restraining means at the second end of said end closure housing except for a space occupied by said at least one air seal ring,
wherein the securing means comprises a plurality of grooves cut into the interior cylindrical surface of the spacer ring,
each groove having side walls parallel to the axis of the cylinder defined by the interior side walls of said spacer ring,
first and second ends on said spacer ring,
a plurality of said grooves opening on said first end of the interior cylindrical walls of said spacer ring but terminating at a point short of the second end of the interior cylindrical surface of said spacer ring,
a plurality of grooves opening onto the second end of the interior cylindrical surface of said spacer ring but terminating at a point short of said first end of said interior cylindrical surface of said spacer ring,
one wall of each of said plurality of grooves opening on said first end of said interior cylindrical surface of said spacer ring being cut along a line colinear with a line defining a wall of one each of the plurality of grooves opening on the second end of said interior cylindrical surface of said spacer ring,
communication between each of the grooves opening on said first end of said interior cylindrical surface of said spacer ring and one each of said grooves opening on said second end of said interior cylindrical surface of said spacer ring,
means for securing the attaching means located at the first end of the end closure housing and the attaching means on the first end of the tubular material-conveying carrier located in the region of communication between each of the said grooves opening on the said second end of the interior cylindrical surface of the spacer ring and one each of the said grooves opening on the first end of said interior cylindrical surface of said spacer ring,
the pivot means comprises a pivot sleeve attached to the disclike cap near a cylindrical edge of said disclike cap,
cylindrical interior walls in said end closure housing unit,
an elongated pylon having a generally oval cross section affixed to the interior wall of said end closure housing unit,
first and second ends on said elongated pylon so that the second end is flush with the second end of the end closure housing unit and the first end protrudes some distance beyond the first end of said end closure housing unit,
cylindrical channel for receiving said pivot sleeve journaled into the said second end of said elongated pylon and passing through said elongated pylon to said first end thereof,
a pivot pin,
a cylindrical channel axial of said pivot sleeve journaled through said pivot sleeve for receiving said pivot pin,
means for securing said pivot pin against axial movement at said first end of said elongated pylon,
the means for imparting torque to the disclike end cap cooperates with the said pivot sleeve wherein the said pivot sleeve has first and second ends,
the first end of said pivot sleeve is attached to said disclike end cap, the second end of said pivot sleeve has a shape suitable for imparting cam action, a cam follower floating in the said cylindrical channel for receiving said pivot sleeve and having a cam shape adapted to receive the shape of the second end of said pivot sleeve, means for preventing said cam follower from rotating along the axis of the said cylindrical channel, biasing means for urging the cam follower upwards against the second end of the pivot sleeve so that a torque is imparted to said pivot sleeve whenever the cam shape on the second end of said pivot sleeve does not conform to the cam shape of the cam follower due to relative angular displacement, and means for preventing angular rotation of the pivot sleeve at one point on the arc of rotation of said pivot sleeve so that displacement is maintained between the cam shape on the second end of the pivot sleeve and the cam shape of the cam follower when said disclike end cap is in alignment with the end closure housing.

4. Apparatus for containing articles to be conveyed through a pneumatic tube, comprising, in combination:

a tubular material-conveying carrier having first and second ends, at least one hollow end closure housing having first and second ends, attaching means on the first end of the at least one end closure housing, attaching means on the at least one end of said tubular material-conveying carrier, annular restraining means at the second end of said at least one end closure housing, annular restraining means set away from said at least one end of said tubular material-conveying carrier, at least one air seal ring adapted for insertion over said attaching means of said first end of said at least one end closure housing and capable of being restrained against axial movement past said second end of said at least one end closure housing unit by said annular restraining means thereon, the at least one air seal ring adapted for insertion over the attaching means on the at least one end of the tubular material-conveying carrier and capable of being restrained by said annular restraining means set off from said at least one end of said tubular material-conveying carrier, means for securing the attaching means of the first end of said at least one end closure housing to the attaching means of said at least one end of said tubular material-conveying carrier, space filling means for preventing axial movement of the at least one air seal ring between the annular restraining means on the second end of said at least one end closure housing and the annular restraining means set away from said at least one end of said material-conveying carrier, at least one disc-like cap for covering said second end of said at least one end closure housing unit, means contained within the at least one end closure housing unit and attaching to the at least one disc-like cap for pivoting the disc-like cap in its own plane about an axis located near a circumferential edge of the said disc-like cap, means for creating a torque at the axis of rotation of said at least one disc-like cap and acting between said disc-like cap and said at least one end closure housing, said means for spacing and said means for securing being incorporated together into at least one spacer ring having an interior cylindrical surface on which the means for securing is located, said spacer ring having an axial length sufficient to fill the space between the annular restraining means set off from said first end of said tubular material-conveying carrier and the annular restraining means at the second end of said end closure housing except for a space occupied by said at least one air seal ring, said securing means including a plurality of grooves cut into the interior cylindrical surface of the spacer ring, each groove having side walls parallel to the axis of the cylinder defined by the interior side walls of said spacer ring, first and second ends on said spacer ring, a plurality of said grooves opening on said first end of the interior cylindrical walls of said spacer ring but terminating at a point short of the second end of the interior cylindrical surface of said spacer ring, a plurality of grooves opening onto the second end of the interior cylindrical surface of said spacer ring but terminating at a point short of said first end of said interior cylindrical surface of said spacer ring, one wall of each of said plurality of grooves opening on said first end of said interior cylindrical surface of said spacer ring being cut along a line co-linear with a line defining a wall of one each of the plurality of grooves opening on the second end of said interior cylindrical surface of said surface ring, communication between each of the grooves opening on said first end of said interior cylindrical surface of said spacer ring and one each of said grooves opening on said second end of said interior cylindrical surface of said ring, and, means for securing the attaching means located at the first end of the end closure housing and the attaching means on the first end of the tubular material-conveying carrier located in the region of communication between each of the said grooves opening on said second end of the interior cylindrical surface of the spacer ring and one each of said grooves opening on the first end of said interior cylindrical surface of said spacer ring.

5. The apparatus for containing material to be conveyed within a pneumatic tube as claimed in claim 4, wherein the pivot means comprises a pivot sleeve attached to the disc-like cap near a cylindrical edge of said disc-like cap, including:

cylindrical interior walls in said end closure housing unit, an elongated pylon having a generally oval cross section affixed to the interior wall of said end closure housing unit, first and second ends on said elongated pylon so that the second end is flush with the second end of the end closure housing unit and the first end protrudes some distance beyond the first end of said end closure housing unit, a cylindrical channel for receiving said pivot sleeve journalled into the said second end of said elongated pylon and passing through said elongated pylon to said first end thereof, a pivot pin, a cylindrical channel axial of said pivot sleeve journalled through said pivot sleeve for receiving said pivot pin, and, means for securing said pivot pin against axial movement at the first end of said elongated pylon.

6. The apparatus for containing material to be conveyed in a pneumatic tube as claimed in claim 5, wherein:

the means for imparting torque to the disc-like end cap cooperates with the said pivot sleeve, said pivot sleeve having first and second ends, the first end of said pivot sleeve is attached to said disc-like end cap, the second end of said pivot sleeve has a shape suitable for imparting cam action, a cam follower floating in the said cylindrical channel for receiving said pivot sleeve and having a cam shape adapted to receive the shape of the second end of said pivot sleeve, means for preventing said cam follower from rotating along the axis of the said cylindrical channel, biasing means for urging the cam follower upwards against the second end of the pivot sleeve so that a torque is imparted to said pivot sleeve whenever the cam shape on the second end of said pivot sleeve does not conform to the cam shape of the cam follower due to relative angular displacement, and, means for preventing angular rotation of the pivot sleeve at one point on the arc of rotation of said pivot sleeve so that displacement is maintained between the cam shape on the second end of the pivot sleeve and the cam shape of the cam follower when said disc-like end cap is in alignment with the end closure housing.

7. In a pneumatic carrier tube of the type having an access opening and a closure cap rotatably coupled to the carrier tube for movement from a first position in which the access opening is covered, to a second position in which the access opening is uncovered, the improvement comprising a coupling adapter interposed between said closure cap and said carrier tube, said coupling adapter including a tubular pylon member received within said carrier tube, said pylon member having an axially extending slot; a tubular pivot sleeve coupled to said closure cap and rotatably disposed within said pylon member, the terminal end of said pivot sleeve member having a cam face; a floating cam follower having a cam image face engagable with the cam face of said sleeve member and a radially projecting guide peg slidably received within said pylon slot; a pivot pin coupled to said closure cap and extending through said pivot sleeve, said tubular pylon and said floating cam; and, bias means engaging said floating cam follower and said pylon member for maintaining a yieldable thrusting force against said pivot sleeve.

8. In a pneumatic carrier tube of the type having an access opening and a closure cap rotatably coupled to the carrier tube for movement from a first position in which the access opening is covered, to a second position in which the access opening is uncovered, and having a removable, external annular seal for engaging the bore of a pneumatic transport tube, the improvement comprising an tubular coupling adapter interposed between said closure cap and said carrier tube, said closure cap being pivotally coupled to said adapter, and an annular spacer ring interlocking said coupling adapter to said carrier tube and confining said annular seal.

* * * * *